United States Patent [19]
Cooke et al.

[11] 3,911,050
[45] Oct. 7, 1975

[54] FIRE RETARDANT POLYESTERS

[75] Inventors: Victor F. G. Cooke, Youngstown; James A. Duquin, Tonawanda, both of N.Y.

[73] Assignee: Hooker Chemicals & Plastics Corporation, Niagara Falls, N.Y.

[22] Filed: May 23, 1973

[21] Appl. No.: 363,236

[52] U.S. Cl. ............... 260/869; 260/77; 260/865
[51] Int. Cl.² ................ C08G 63/52; C08L 67/06
[58] Field of Search ........... 260/75 M, 865, 869, 77

[56] References Cited
UNITED STATES PATENTS

| | | | |
|---|---|---|---|
| 3,151,183 | 9/1964 | Bill et al. | 260/869 |
| 3,274,163 | 9/1966 | Elfers et al. | 260/78.4 |
| 3,274,293 | 9/1966 | Elfers et al. | 260/869 |
| 3,536,782 | 10/1970 | Toggweiler et al. | 260/869 |
| 3,697,625 | 10/1972 | Smith et al. | 260/869 |

OTHER PUBLICATIONS

Bjorksten, "Polyesters," Reinhold 1956, pp. 4–7.

*Primary Examiner*—Melvin Goldstein
*Assistant Examiner*—E. A. Nielsen
*Attorney, Agent, or Firm*—Peter F. Casella; James F. Mudd

[57] ABSTRACT

Fire retardant polyesters containing chemically bonded halogen are provided. The new polyesters have an average molecular weight of at least about 1100 and at least two reactive double bonds per polymer chain. When crosslinked with an ethylenic monomer, e.g., styrene, the cured resins pass the ASTM-E-84-68 Flame Spreading Test with a rating of 25 or less.

19 Claims, No Drawings

FIRE RETARDANT POLYESTERS

FIELD OF INVENTION

This invention relates to new fire retardant polyesters. More particularly it relates to polyesters containing chemically bonded halogen and at least two reactive double bonds per polymer chain of at least 1100 units of average molecular weight.

BACKGROUND OF THE INVENTION

The production of infusible insoluble polyester resins which are fire retardant and have high resistance to heat is of considerable industrial importance. For instance, castings, moldings, formed articles, or laminated structures bonded by polyester resins are, for many applications, required, or at least desired to be resistant to fire and should be capable of enduring intense heat without contributing fuel to the fire. For example, castings for live electrical contacts, structural members, pipes, wall coverings, panels, ash trays, etc., should be flame retardant and/or once ignited should not propagate the flame or otherwise support combustion.

Polyester resins are well known in the art, and their preparation from polycarboxylic acids, both saturated and unsaturated, and polyols is also known. For example polyesters have been prepared by the interreaction of phthalic acid or the anhydride thereof and a polyol such as ethylene or propylene glycol. The use of unsaturated acids such as maleic or fumaric acids introduces reactive ethylenic unsaturation into the polymer chain and results in unsaturated polyesters. Such unsaturated polyesters can be crosslinked with an ethylenic monomer such as styrene to provide an infusible polyester resin.

It is also known to introduce halogen such as chlorine or bromine, into the polyester resin by the use of halogenated acids such as tetrachlorophthalic anhydride or tetrabromophthalic anhydride or by the use of halogenated polyols.

In U.S. Pat. No. 3,274,293, cross linked polyester resins which are said to have a relatively high order of non-flammability were described which were prepared by reacting an ethylenically unsaturated organic dibasic acid or mixtures thereof with nonethylenically unsaturated dibasic acids, an alkylene oxide and a halogenated monofunctional alcohol, e.g., 2,3-dibromopropanol. The resultant polyesters wherein alkylene oxides are used as reactants are essentially linear in character. The presence of the monofunctional halogenated alcohol in the polyester reaction mass functions as a chain stopper and this, coupled with the essentially linear character of the resultant polyester chains produces a polyester product having either a relatively low average molecular weight or a product containing insufficient halogen to attain an acceptable level of fire retardance. Since fire retardancy and other physical properties are known, in general, to be dependent upon the degree of cure, this procedure which results in low average molecular weight polymers leaves something to be desired.

In U.S. Pat. No. 3,520,951 there are disclosed a group of flame retardant polyesters containing at least about 10% by weight chlorine which is chemically bonded to the polymer chain in the form of the ar-pentachlorophenoxyacetyl radical, the polyester being derived by the reaction of a dicarboxylic acid such as adipic acid or maleic acid and a dihydric alcohol such as diethylene glycol which may be modified with a polyhydroxy compound such as trimethylol propane, glycerol, pentaerythritol or the like. A typical polyester resin prepared in accordance with this disclosure from 0.12 mole pentachlorophenoxy acetic acid, 0.064 mol maleic anhydride, 0.035 mol glycerol and 0.073 mol 1,2-propylene glycol gave a hard brittle unsaturated polyester base resin. When this base resin was cured by reaction with styrene a hard brittle resin resulted. Both the base resin and the cured resin were flame retardant according to ASTM-D-635-63 test. It can be seen that such resins, being hard and brittle are unsatisfactory for many purposes. The base resin has a relatively low average molecular weight, about 750-800, and has less than one double bond per polymer chain. This deficiency results in an inability to cross-link the polyester and curing with styrene results in chain extension. Further, as is known, the ASTM-D-635 test is not a very meaningful test. Thus while these prior art resins are flame retardant by the ASTM-D-635 test, by the more stringent ASTM-D-757 test which measures the rate of burning, these resins gave a burning rate of 0.2 to 0.25 inches per minute, which for many present day applications is unsatisfactory.

OBJECTS OF THE INVENTION

It is, therefore, a principal object of the present invention to provide highly fire retardant unsaturated polyester resins having an average of at least two reactive double bonds per polymer chain which can be cross linked with ethylenic monomers.

Another object is to provide highly fire retardant unsaturated polyesters having an average of at least two reactive double bonds per polymer chain which chains contain chemically bonded halogen derived from a halogenated monofunctional alcohol.

A more specific object is to provide highly fire retardant unsaturated polyesters containing chemically bonded bromine derived from 2,3-dibromopropanol.

Other objects will be apparent to those skilled in this art from the following description of the invention.

SUMMARY OF THE INVENTION

In accordance with the present invention, we have found the highly flame retardant unsaturated polyesters having an average molecular weight of at least about 1100 and an average of at least two reactive double bonds per molecular chain can be prepared by reacting a mixture of a polyhalopolycarboxylic acid or anhydride and an ethylenically unsaturated polycarboxylic acid or anhydride thereof with a mixture comprising a triol or higher polyol and a halogenated monofunctional alcohol. The resultant polyester can be cross-linked by reaction with ethylenic monomers to form insoluble and infusible resin which are highly fire retardant.

DETAILED DESCRIPTION OF THE INVENTION

In accordance with a preferred mode of preparing the highly fire retardant unsaturated polyesters of this invention, about 1.5 to 2.5 equivalents of an $\alpha,\beta$ unsaturated polycarboxylic acid or anhydride thereof, e.g., maleic anhydride or fumaric acid, and from about 1.5 to about 0.5 equivalents of a polyhalopolycarboxylic acid or anhydride thereof is reacted with a mixture of about 0.8 to about 1.2 equivalents of a halogenated monofunctional alcohol, from 0 to about 1 equivalent of a dihydric alcohol and about 1 to about 2 equivalent of a polyhydric alcohol, having at least three hydroxyl groups per molecule, are reacted together to form a polyester, having an average molecular weight of at least about 1100 and an average at least two reactive double bonds per polymer chain. The resultant unsaturated polyester may be mixed with an ethylenic monomer, e.g., styrene, and then cured in the presence of a free radical catalyst to form insoluble and infusible cross-linked resins having a high degree of fire retardance.

By "reactive double bond" is meant an ethylenic bond which undergoes reaction with an ethylenic monomer, e.g., styrene.

The polycarboxylic reactants, the monofunctional alcohol and polyol reactants are reacted in equivalent proportions. Preferably the alcohol functions are present in slight excess.

The polycarboxylic reactants used in these formulations are a mixture of a polyhalogenated polycarboxylic acid or anhydride and an $\alpha,\beta$-unsaturated polycarboxylic acid or anhydride.

The polyhalogenated polycarboxylic reactants are preferably saturated or free from other than aromatic unsaturation. Representative Examples of such polycarboxylic acids are tetrachlorophthalic anhydride
tetrabromophthalic anhydride
dibromotetrahydrophthalic anhydride
chlorendic anhydride (chemical 1,4,5,6,7,7-hexachlorobicyclo-(2.2.1)-5-heptene-2,3-dicarboxylic anhydride)
dichlorosuccinic acid
Chloran anhydride (chemically 1,2,3,4,4a, 5, 8, 8a-octahydro-5,8-methano-2,3-naphthalenedicarboxylic anhydride)

The $\alpha,\beta$-unsaturated polycarboxylic acids or anhydrides suitable for use in the preparation of the polyesters of this invention are well known components of unsaturated polyesters. Such components are preferably dibasic organic acids such as maleic anhydride or fumaric acid, and may contain up to 12 carbon atoms per molecule. Representative examples of the ethylenically unsaturated polycarboxylic acids or anhydrides include maleic anhydride
chloromaleic anhydride
fumaric acid
itaconic anhydride
citraconic anhydride
aconitic acid The ratio of the polycarboxylic acid components of the polyester may be varied over a considerable range. The polyhalopolycarboxylic acid serves as a halogen source, preferably about 20–40% of halogen should be present in the final resin. The ethylenically unsaturated polycarboxylic acid component provides cross link sites in the polyester and sufficient of this component should be used to provide an average of at least two and preferably from 2.2 to 3 reactive double bonds, i.e., cross link sites, in the polyester. In general, from about 1.5 to about 2.5 equivalents of the ethylenically unsaturated acid and from about 1.5 to 0.5 equivalents of the polyhalopolycarboxylic acid are used. Thus about 0.2 to 1 equivalent of the polyhalopolycarboxylic acid component is generally used for each equivalent of the unsaturated polycarboxylic acid, preferably about 0.5 equivalent per equivalent. The polyesterification is effected by reacting the polycarboxylic acid mixture with a polyol mixture having a functionality of more than two and a halogenated monofunctional alcohol. The polyol mixture can and preferably is, a mixture of at least one diol and at least one polyol of higher functionality, i.e., a triol, tetrol or pentol.

Representative examples of the diols which can be used include the following ethylene glycol
diethylene glycol
polyethylene glycol
1,2-propylene glycol
1,3-propylene glycol
diethylene glycol
dipropylene glycol
1,4-butane diol
1,4-butylene diol
1,3-butane diol
1,5-pentadiol
1,6-hexane diol
1,4-cyclohexane dimethanol
neopentyl glycol
trimethylpentane diol Mixtures of these and equivalent diols are contemplated, also Representative examples of the polyols of functionality higher than two include the following Glycerine
trimethylol ethane
trimethylol propane
1,2,6-Hexanetriol
pentaerytritol
Sorbitol Mixtures of these and equivalent polyols are contemplated also.

The ratio of diol to polyols can be varied over a considerable range. Thus from 0 to 1 equivalents of diol to 1 to 2 equivalents of polyol can be used, preferably from about 0.5 to 1 equivalent of diol and from about 1 to 1.67 equivalents of polyol are used. The total amount (expressed in equivalents of hydroxyl group) of diol, polyol and monofunctional alcohol should be about equal and preferably slightly in excess of the total equivalents of carboxylic groups present. Thus the ratio of hydroxyl to carboxyl groups should be in the range of about 1 to about 1.1 hydroxyl groups per carboxyl group.

The diols generally contain from 2 to about 10 carbon atoms and the polyols of more than two hydroxyl groups generally contain from 3 to about 8 carbon atoms.

The halogenated monofunctional alcohol used in the process of this invention can be any halogenated aliphatic primary, secondary or tertiary alcohol of the general formula $$C_nH_{2n+1-z}Y_zOH$$

wherein $n$ is 2 to 6, Y is fluorine, chlorine and bromine, and $z$ is 2 to 7. Representative examples of this class of monofunctional haloalcohols are the following 2,2-dichloroethanol
2,2,2-trichloroethanol
2,2,2-tribromoethanol
1,1-dichloro-2-propanol
1,1,3-trichloro-2-propanol
1,1,1-trichloro-3-bromo-2propanol 1,1,3,3-tetrabromo-2-propanol
1,1,1,3,3-pentachloro-2-propanol
1-bromo-1,1-dichloro-2-propanol
1,1-dibromo-2-propanol
1,1,1-tribromo-2-propanol
1,1,1-tribromo-3-chloro-2-propanol
1,1,1-trifluoro-3-bromo-2-propanol
1,1,1-trifluoro-2-propanol
1,3-dibromo-2-propanol
2,2,3,3-tetrafluoro-1-propanol
2,2,3,3,3-pentafluoro-1-propanol
2,3-dibromo-1-propanol
2,2,3,3,4,4,4-heptafluoro-1-butanol
1,1,1-trichloro-2-methyl-2-propanol Mixtures of these and equivalent monofunctional alcohols are contemplated also.

Of the halogens, bromine is preferred and 2,3-dibromo-1-propanol is the especially preferred member of this class because of its overall effectiveness, ready availability and reasonable cost.

The amount of the monofunctional haloalcohol used can be varied over a considerable range. In general the amount of this reactant can be in the range of about 0.4 to about 0.6 equivalent per equivalent of hydroxyl function present in the mixture of polyols used.

The esterification reaction is carried out in a conventional manner, that is the carboxylic and hydroxylic reactants are mixed and then heated to and maintained at a temperature between about 100 and 200 degrees centigrade, preferably in an inert atmosphere as the water evolved in the esterification is removed. Preferably a temperature of about 150 to 175 degrees centigrade is used.

The progress of the esterification reaction can be followed by collecting and measuring the water liberated, by acid number and viscosity of the reaction mass, or by other methods known in this art. Conveniently, the progress of the reaction can be followed by following the reduction of the acid number of the mass and when this value falls to about 25 to 40, the reaction may be considered to be completed.

An azeotroping solvent, such as toluene, xylene and the like, may be present in the mixture to facilitate removal of the water produced by the reaction.

Esterification catalysts such as p-toluenesulfonic acid, benzenesulfonic acid, phosphoric acid, amines such as pyridine, triethylamine, quinoline, and the like may be added to the reaction mass.

The resultant ethylenically unsaturated polyester can be cured by co-polymerizing it with an ethylenically unsaturated monomeric material co-polymerizable therewith, preferably in the presence of a catalytic amount of a conventional polymerization catalyst such as a free radical catalyst of which benzoyl peroxide, cumene peroxide and the like are typical examples.

The ethylenically unsaturated monomers which can be used for this copolymerization reaction can be varied widely. The monomers which can be used include vinylidene compounds and mixtures thereof capable cross-linking ethylenically unsaturated polymer chains at their points of unsaturation and usually they contain the reactive group, $CH_2=C<$. Representative examples of such components are styrene
chlorostyrenes
methyl styrenes, such as α-methyl-styrene
p-methyl styrene
divinyl benzene
methylmethacrylate
methyl acrylate
allyl acetate
vinyl acetate
diallyl sebacate
diethylene glycol bis (allyl carbonate)
triallyl phosphate
diallylbenzene phosphonate
diallyl chlorendate
diallyl tetrachlorophthalate Mixtures of these and equivalent materials are contemplated also.

The monomer, or mixture thereof, can be admixed with the polyester in an amount sufficient — usually in the range of from about 25 to about 40 percent by weight of the polyester-monomer mixture — to produce a cross-linked polymer and the mixture heated, in the presence of a suitable catalyst, e.g., a free radical catalyst to an elevated temperature to cross-linked or cure the polymer mixture. With proper catalyst systems, such as cobalt naphthenate and methyl ethyl ketone peroxide, room temperature cures can be obtained, also.

To prevent premature polymerization at this stage, i.e. after the admixture of the polyester with the ethylenic monomer but before the addition of the catalyst, a polymerization inhibitor, such as hydroquinone, is advantageously added to the polyester mixture, or preferably to one of its components prior to mixing of the components, especially if the curable mixture is to be stored or shipped in commerce prior to curing or effecting the polymerization reaction.

The properties and structure of the polyesters and the cured resins obtained therefrom can be varied by utilizing different proportions or ratios of the several reactants. In general the higher the ratio of polyols (of higher functionality than two) to diols used, the higher the average molucular weight of the resultant polymers. The polyols serve a dual function, that is they produce branching sites in the polymer molecule and partly compensate for the monofunctionality of the halogenated alcohol. Even when the polyester is formulated to contain only monofunctional and polyfunctional hydroxyl components (i.e., no diol is used), the danger of gellation due to excessive chain branching is substantially avoided. Further the higher the halogen content incorporated into the polyester chain, the better the over-all flame retardance. Also the higher the average molecular weight and the greater the crosslink density the better the chemical resistance of the final resins. Accordingly, it is preferred to adjust the ratio of the polyhalogenated polycarboxylic acid to α,β-unsaturated polycarboxylic acid to as high as feasible while still insuring that at least about two double bonds per molecule will be present in the polyester.

The compositions of this invention can also contain optional ingredients such as pigments, delustrants, heat and light stabilizers, processing aids and other materials known in the art.

It is for example, well known in the art to use light stabilizers, known also as UV absorbers, such as resbenzophenones salicylic acid esters, and the like to prevent or at least minimize the degradation of the color of plastic compositions on exposure to sunlight. Usually about 0.5 to 2% of such agents suffices to provide acceptable protection. However it is further found that if the composition contains weathering stabilizing amount of a trialkyl phosphate, the composition was surprising resistant to degradation on exposure to the elements, e.g., sunlight, rain, heat, and the like. Preferably at least 2 parts per hundred parts of resin ("phr") are used and especially from about 3 to about 12 phr of the preferred trialkyl phosphate, triethyl phosphate are used. Although the trialkyl phosphate is effective alone to impart the weathering stabilization, it is preferred that it be used in conjunction with a small amount, typically along 0.5 to 2.0 percent by weight of the resin composition, of a U.V. stabilizer. Typical of the trialkyl phosphates which can be used for this purpose are those in which the alkyl groups are the same or different and contain from one to six carbon atoms as for example trimethyl phosphate
  triethyl phosphate
  tri-n-propyl phosphate
  tri-isopropyl phosphate
  tri-sec-butyl phosphate
  tri-n-amyl phosphate
  tri-n-hexyl phosphate
  mono-ethyl-dimethyl phosphate
  monomethyl-di-t-butyl phosphate Mixtures of these and equivalent trialkyl phosphates are contemplated also.

In order that this invention may be more readily understood and to further illustrate the details thereof, the following examples which include the preferred manner of carrying out the process are given. In the examples, as well as in the above specification and claims appended hereto, parts and percentages are by weight and temperatures are given in degrees centigrade, unless otherwise specified.

EXAMPLE 1

A mixture of 194.5 parts (0.5 mole) of chlorendic acid, 98.1 parts (1.0 mole) of maleic anhydride, 217.9 parts (1.0 mole) of 1,2-dibromopropanol and 65.3 parts (1.05 mole) of ethylene glycol were heated, under a steady nitrogen sparge, to and maintained at about 165 degrees, while collecting the water formed as a distillate. After about 12 hours, the acid number of the reaction mixture had decreased to 46. A small quantity, about 0.10 part, of tolulhydroquinone was added to the mixture and the reaction was continued for an additional 4 hours at which time the acid number was about 30. The resultant polyester product was analyzed and found to contain 26.0 percent bromine, 21.6% chlorine and the average molecular weight of the polymer was 775. An amount of styrene equivalent to about one third the weight of the polyester mass was added to the hot mass and the resultant solution was cooled to ambient temperature. The viscosity (Brookfield) of the solution was 360 cps at 25°.

EXAMPLES 2–6

The procedure of Example 1 was repeated except that in place of the 65.3 parts of ethylene glycol, various mixtures of ethylene glycol and glycerine were used to form the polyester. The molar ratios of these components in the various mixtures and the pertinent analytical data are set out in the following Table I.

TABLE I

| Ex. | Glycol Moles | Glycerine Moles | Reaction Time Hours | Final AN | Br % | Cl % | Viscosity Cps/25°[1] | Aver.[2] Mol Wt. |
|---|---|---|---|---|---|---|---|---|
| 2 | 0.50 | 0.33 | 25 | 35 | 26.2 | 21.2 | 1180 | 1170 |
| 3 | 0.40 | 0.40 | 28 | 34 | 26.5 | 20.0 | 1620 | 1150 |
| 4 | 0.33 | 0.44 | 27 | 35 | 26.3 | 21.8 | 1830 | 1310 |
| 5 | 0.25 | 0.50 | 31 | 34 | NA[3] | NA | 2725 | 1320 |
| 6 | 0.00 | 0.67 | 22 | 32 | NA | NA | 4500 | 1450 |

LEGEND:
[1] Of Styrenated polyester solution
[2] Of base polyester
[3] Not analyzed Each of the styrenated resin solutions (styrene added in an amount equal to one third of the polyester mixture) and cured in the form of a one-eighth inch thick casting in the presence of one percent of Lupersol 259, a commercially available peroxide catalyst, containing essentially 1,1,3,3-tetramethylbutylperoxy-2-ethyl hexanoate, at 130 degrees.

The flame retardance of the cured resins was determined by the Globar (ASTM-D-757) standard procedure. The Heat Distortion Temperature for each of the cured resins was determined also. The results of these tests are set out in Table II, below.

TABLE II

| Resin Of Exp. | Ave. Mol. Wt. | Globar in./min. | HDT Degrees C. |
|---|---|---|---|
| 1 | 775 | 0.115 | 69.0 |
| 2 | 1170 | 0.105 | 93.5 |
| 3 | 1150 | 0.104 | 92.5 |
| 4 | 1310 | 0.0834 | 90.0 |
| 5 | 1320 | 0.0972 | 91.3 |
| 6 | 1475 | 0.0868 | 92.8 |

These data clearly show that by replacement of a portion of the diol with a polyol, e.g., glycerine, in the polyester formulation results in a substantial increase in the flame retardance of the cured polymers as measured by the Globar test procedure. By the ASTM-635 test, all of these polyesters were non-burning in character.

A glass laminate prepared with the resin product of Example 3, having an average molecular weight of 1150, when tested in Steiner Tunnel (ASTM-E-84) gave a flame spread rating of 23.1. By contrast a similar glass laminate prepared with the resin of Example 1, having an average molecular of 775, had been this Tunnel Test a flame spread rating of about 50.

EXAMPLE 7

This Example is a comparison of the resin prepared according to Example 1 of U.S. Pat. No. 3,520,951 with the resins of this invention.

The resin of Example 1 of U.S. Pat. No. 3,520,951 was prepared as follows:

A mixture of 194.5 parts (0.60 mole) of pentachlorophenoxy acetic acid, 31.95 parts (0.325 mole) of maleic anhydride, 16.15 parts (0.175 mole) of glycerol and 27.75 parts (0.365 mole) of 1,2-propylene glycol was heated at 160 to 165 degrees under atmosphere of nitrogen for about 7 hours. At this time the acid number of the mixture was 28.2 mg of KOH per gram of resin. The heat was removed and 0.15 part of hydroquinone was added after which the polyester mixture was cooled to ambient temperature.

The polyester was a hard, yellow, brittle solid, having an average molecular weight of 780 and a chlorine content of 42.2 percent.

The resin (235 parts) was reheated to 90 degrees and mixed with 70.4 parts of styrene. The resultant solution was pale yellow (Gardiner color of 1-2) and contained 23.3 percent chlorine.

The styrenated polyester was divided into two equal portions.

One portion was cured in the presence of one percent of Lupersol 259 at 70 degrees for 15 hours and then at 130 degrees for 15 hours. The second portion was cured in the presence of 0.5 percent of benzoyl peroxide and 0.5 percent of methylethylketone peroxide at 110° for 17 hours. Both portions were cured as one eighth inch thick castings.

Both cured resins were hard brittle solids. They were extremely brittle, so much so that when tested in the Barcol Hardness tester the resins shattered making it impossible to obtain accurate hardness data.

Although the resins were flame retardant the ASTM-D-635 test, by the Globar Test, the first resin had a burning rate of 0.208 inches per minute and the second resin had a burning rate of 0.237 inches per minute (average of two determinations). Since the resins of this invention, have a burning rate of from 0.0834 to 0.105 inches per minute it can be seen that the resins of U.S. Pat. No. 3,520,951 are substantially inferior to those of this invention with respect to flame retardance, at least.

The base resin of this comparative example has an average molecular weight of 780 and an average number of maleic acid residues (i.e., reactive double bonds) per molecular chain of only 0.94. In these prior art resins, the source of halogen is the monofunctional pentachlorophenoxy acetic acid component. Since a relatively large amount of this component must be used to obtain flame retardance this necessarily limits the amount of maleic anhydride (11.8% in this instance) the source of double bonds in the molecular chain, in order to obtain the required balance of hydroxyl and carboxyl functions.

By contrast, when utilizing the mono-functional alcohol as a source (together with the chlorendic acid) of halogen, it is not necessary to limit the proportion of maleic acid in the polymer formulation. Thus in an average formulation of this invention, the amount of maleic anhydride used is about 17 percent. At an average molecular weight of 1200 the number of double bonds per molecular chain is 2.08, and at a 1500 average molecular weight, the number of double bonds is 2.6. Effective cross-linking is thus obtainable with the polyesters of this invention, the resultant cured resins are not brittle in character, and possess a surprising high degree of flame retardance.

EXAMPLE 8

In this example, the formulation of the polyester is substantially that of Examples 1–5 above, except that in place of the 2,3-dibromopropanol, pentachlorophenoxy acetic acid was used as the monofunctional component. Inasmuch as the latter is a carboxyl reactant, whereas the former is a hydroxyl reactant, the ratio of the remaining reactants were adjusted while attempting to preserve the overall relative proportions as close as feasible.

Thus a mixture of 0.167 mole of chlorendic acid, 0.333 mole of pentachlorophenoxy acetic acid, 0.333 mole of maleic anhydride, 0.366 mole of ethylene glycol and 0.20 mole of glycerin was heated, in an atmosphere of nitrogen at 165 degrees for 6.5 hours. The acid number of the mixture was 25.5. After the addition of 0.06 part of tolulhydroquinone the polyester mixture was cooled to ambient temperature. The polyester was a hard yellow solid, having an average molecular weight of 1300 and a chlorine content (calculated) of about 45 percent. The base polyester was reheated to about 90° and styrenated to a level of 30 percent.

This resin contains about 13.2 percent maleic acid and thus each polymer chain of average molecular weight of 1300 contains only 1.75 double bonds.

When cured in the presence of one percent Lupersol 259 at 130 degrees, the resin had a barcol hardness of 47, a heat distortion temperature of 68° and Globar test rating of 0.333 inches/minute.

EXAMPLE 9

In this example the polyol was pentaerythritol. Since this is tetrafunctional a smaller molar proportion of it than glycerol is required to attain the desired increase in molecular weight.

A mixture of 196.1 (0.90 mole) parts of 2,3-dibromopropanol, 36.9 parts (0.594 mole) ethylene glycol, 24.5 parts (0.180 mole) pentaerythritol, 88.3 parts (0.90 mole) maleic anhydride and 175.1 parts (0.45 mole) chlorendic acid was heated at 165° for 19 hours. The acid number of the reaction mass was 34.9 mg. KOH/g. Heat was removed and 0.105 part of toluhydroquinone was added. The polyester had a molecular weight, by vapor phase osmometry, of 1530. Styrene was added to the warm resin, so that the final solution contained 29.6 percent styrene. It had a Gardner color of 1 and a Brookfield viscosity at 25° of 910 cps.

The styrenated resin was cured, in the form of a ⅛ inch casting at room temperature using 0.07 percent of a cobalt octoate solution (containing 12 percent cobalt) and 1.0 percent of Lupersol DDM (a 60 percent solution of methyl ethyl ketone peroxide in dimethyl phthalate). The clear, very pale green casting had a ASTM-D-757 burning rate of 0.0833 in./min., a heat deflection temperature of 93.0° and a Barcol hardness of 49.

EXAMPLE 10

In this example the polyhalodicarboxylic acid was tetrachlorophthalic anhydride.

A mixture of 196.1 parts (0.90 mole) dibromopropanol, 38.0 parts (0.613 mole) ethylene glycol, 24.5 parts of pentaerythritol (0.180 mole), 88.3 parts (0.90 mole) maleic anhydride and 128.7 parts (0.45 mole) tetrachlorophthalic anhydride was heated under a nitrogen atmosphere, at 165°, to reach an acid number of 39 mg. KOH/g. Heat was removed and 0.105 part of toluhydroquinone added. The average mol wt. of the resin by VPO was 1130. Styrene was then added in an amount equal to one-third of the polyester mixture. The styrenated resin was cured as a ⅛ inch thick casting at 130 degrees using Lupersol 259. The cured resin was cloudy and translucent. It had a Barcol hardness of 49, a heat deflection temperature of 97° and an ASTM-D-757 burning rate of 0.196 in./min.

EXAMPLE 11

This example illustrates the use of a catalyst to reduce the heating time in the preparation of polyester.

A mixture of 217.0 parts dibromopropanol (1.00 mole), 27.3 parts of ethylene glycol (0.44 mole), 36.9 parts (0.40 mole) glycerol, 98.1 parts maleic anhydride, 194.4 parts (0.50 mole) chlorendic acid and 1.15 parts of Ultra TX acid (a modified toluene sulfonic acid) were heated at 165 degrees under nitrogen. A cook time of 14 hours was required to attain an acid number of 35 mg KOH/g. After addition of 0.11 part of toluhydroquinone the resin was cooled. It had an average mol weight by VPO of 1170. It was styrenated using 1 part of styrene to 3 parts of resin. A casting was prepared by curing with Lupersol 259 at 130 degrees. It had a Barcol hardness of 46, a heat deflection temperature of 84 degrees and a ASTM-D-757 burning rate of 0.0833 in./min.

EXAMPLE 12

This example shows the use of a solvent to remove water azeotropically during esterification.

A mixture of 196.2 parts (0.90 mole) dibromopropanol, 24.6 parts (0.396 mole) ethylene glycol, 33.2 parts (0.36 mole) glycerol, 88.3 parts (0.90 mole) maleic anhydride, a 175.0 part (0.45 mole) chlorendic acid and about 22 parts of toluene was charged to a reactor fitted with a Dean and Stark receiver. The mixture was heated at 165° under nitrogen and a cycle time of 18 hours was required to attain an acid number of 35 mg. KOH/g. After addition of 0.105 part toluhydroquinone the residual solvent was removed under vacuum. The resulting resin had an average mol wt., by VPO, of 1105. The resin was warmed and styrene added. The styrene content of the resin solution was 28.0 percent.

The resin was cured at room temperature in the form of 1/8 in. thick casting using 0.05 percent of cobalt octoate and 1.0 percent of Lupersol DDM. The cured resin had a Barcol hardness of 47, a heat deflection temperature of 99.0° and an ASTM-D-757 burning rate of 0.0833 in./min.

EXAMPLE 13

This example illustrates the effect of omitting the polyhalodicarboxylic acid from the system but increasing the unsaturation of the polymer by replacing the chlorendic acid by maleic anhydride. Thus both the bromine content and the double bonds per chain are increased.

A mixture of 290.5 parts (1.33 mole) dibromopropanol, 43.4 parts ethylene glycol (0.70 mole), 40.9 parts (0.445 mole) glycerol and 196.1 parts (2.00 mole) maleic anhydride was heated at 160°–165° under nitrogen. A total time of 28 hours was required to reach an acid number of 40. After addition of 0.11 part of toluhydroquinone the resin was cooled. It contained by analysis 40.0 percent bromine and had an average mol wt. of 905. By calculation the polyester contained about 3.3 maleic acid residues per chain.

The resin was hot styrenated using 1 part of styrene to 3 parts of resin. It was cured at 130 degrees using 1 percent by wt. of Lupersol 259. The cured resin had a Barcol hardness of 50, a heat deflection temperature of 116 degrees and an ASTM-D-757 burning rate of 0.156 in./min. The burning rate was higher than expected in view of the high bromine content of the resin, and by this test, is substantially inferior with respect to flame retardance to the resins of this invention.

EXAMPLE 14

This example shows that the resins containing a monofunctional bromine compound and a polychlorinated dicarboxylic acid may be used over a considerable dilution range with styrene, which improves their economics, and still retain excellent fire retardancy.

A resin was prepared from 651 parts (3.00 moles) dibromopropanol, 82.9 parts (1.33 mole) ethylene glycol, 112 parts (1.20 mole) glycol, 294.2 parts (3.00 mole) glycerol and 583.4 parts (1.50 mole) chlorendic acid. The base resin contained by analysis 26.5 percent bromine and 20.0 percent chlorine. It had a molecular weight of 1310. The resin was styrenated at four styrene levels and each styrenated resin hot cured, as a 1/8 in. thick casting, using 1 percent of Lupersol 259. Properties of each composition are given in the table.

| Styrene Content % | Halogen Content | | Barcol Hardness | HDT °C | ASTM D757 Burning Rate in./min. |
|---|---|---|---|---|---|
| | % Br. | % Cl | | | |
| 25 | 19.9 | 15.0 | 48 | 89.3 | 0.0832 |
| 30 | 18.6 | 14.0 | 47 | 92.0 | 0.0832 |
| 35 | 17.2 | 13.0 | 45 | 92.5 | 0.1145 |
| 40 | 15.9 | 12.0 | 44 | 91.8 | 0.170 |

EXAMPLE 15

This example shows the ASTM-E84 flame spread rating containing 30 percent styrene fabricated in the form of a glass laminate.

Base resin of the formulation given in Example 14 was prepared. It had a molecular weight of 1430. It was hot styrenated and contained by 29.8 percent styrene. Twelve ounce panels, 8 ft. + 20 inches, were prepared from the resin and two mats of 2-ounce glass filaments. The panels were cured at room temperature, using 0.06 percent of cobalt octoate and 1 percent of Lupersol DDM, and post-cured at 70 degrees. These panels were tested by the ASTM-E-84 test in the Steiner tunnel and a seprate sample cured as a 1/8 in. thick casting tested by the ASTM-D757 test.

| ASTM-E-84 | 17.9 flame spread rating |
|---|---|
| ASTM-D757 | 0.0729 in./min. |

EXAMPLE 16

This example illustrates the beneficial effect of a trialkyl phosphate on the weathering properties of the polyester resins of this invention.

The base resin formulation given in Example 14 above was used in this example. The base resin was hot styrenated using one part of styrene to three parts of base resin. Three separate 100 part samples of the styrenated resin were prepared and mixed with the additives as described below.

Sample A — 100 parts styrenated resin plus 1 part cyanasorb U.V.9 (2-hydroxy-4-methoxybenzophenone).

Sample B — 100 parts styrenated resin plus 5 parts of triethyl phosphate and 1.0 parts of cyanasorb U.V.9.

Sample C — 100 parts of styrenated resin plus 9.6 parts of triethyl phosphate and 1.0 part of cyanosorb U.V.9.

Each of the above resin mixtures were mixed with a catalyst mixture of 0.5 phr of bis(4-tert-butyl cyclohexyl)peroxy dicarbonate (commercially available under the trade designation of Percadox 16) and 0.5 phr of tert.-butylperbenzoate. Glass laminate panels were prepared from each of the resin mixtures using one layer of a 2 oz. glass fiber mat per panel. The panels were cured at 80° for 4 minutes, the temperature was raised to 120° in 8 minutes and then held at 120° for a further 15 minutes.

The Barcol Hardness of the cured panels was 55 (Sample A), 48 (Sample B) and 40 (Sample C).

The weatherability of the panels was determined by two accelerated tests.

Test 1—"EMMAQUA" (Desert Sunshine Exposure Tests—Phoenix, Ariz.) as described in Proceedings of the 27th Annual Technical Conference—SPI Reinforced Plastics Division—19G. 1972.

Test 2 — ASTM-E-239 Test conducted in a laboratory weatherometer using a 102 minutes of U.V. light and 18 minutes of U.V. light plus water spray.

In the "EMMAQUA" test, after an exposure of 163,500 langleys, the color ratings of the panels (on a scale of 0-poorest rating to 10-perfect condition) was as follows:

| Sample | Rating | Appearance |
|--------|--------|------------|
| A | 6 | Brown spot in center of panel, edges lighter brown to yellow |
| B | 6 | No spot in center of panel, edges yellow |
| C | 8 | Yellow color lighter than B |

By the ASTM-E-239 test, after 2243 hours exposure, Sample A had a brown color, Sample B, had a yellow color and Sample C had a slight yellowish cast.

These tests indicate the surprising improvement in weatherability of the polyester compositions containing triethylphosphate even in addition to a convertional U.V. color stabilizer.

This invention has been described and illustrated by reference to certain specific embodiments. It will, however, be obvious to those skilled in this art that changed in these embodiments may be made without departing from the spirit of this invention.

What is claimed is:

1. An ethylenically unsaturated polyester having an average molecular weight of at least about 1100 and containing at least an average of two reactive double bonds per molecular chain, said polyester being obtained by reacting an acid component comprising a polyhalodicarboxylic acid or anhydride and an α,β-ethylenically unsaturated dicarboxylic acid or anhydride with a polyol component comprising from about 1 to about 2 equivalent proportions of a polyol of functionality greater than two, from 0 to about 1 equivalent proportion of a dihydric alcohol and from about 0.8 to about 1.2 equivalent proportion of a monofunctional haloalcohol of the formula $$C_nH_{2n+1-z}Y_zOH$$

wherein $n$ is 2 to 6, $z$ is 2 to 7 and Y is halogen of the group consisting of fluorine, chlorine and bromine.

2. The polyester of claim 1 wherein the acid component comprises from about 0.2 to 1 equivalent of the polyhalodicarboxylic acid or anhydride per equivalent of the α, β-unsaturated dicarboxylic acid or anhydride.

3. The polyester of claim 2 wherein the polyhalodicarboxylic acid is chlorendic acid.

4. The polyester of claim 2 wherein the α,β-unsaturated dicarboxylic acid or anhydride is maleic acid or anhydride.

5. The polyester of claim 1 wherein the polyol component contains also a diol.

6. The polyester of claim 1 wherein the polyol component comprises from 0 to about 1 equivalent of a diol, from about 1 to 2 equivalents of a polyol of functionality greater than two and from about 0.8 to about 1.2 equivalents of said halogenated monofunctional alcohol, the total equivalents of hydroxyl group present in said polyol mixture being about equal or slightly in excess of the total equivalents of carboxyl groups present.

7. The polyester of claim 6 wherein said diol is ethylene glycol, said polyol is glycerine and said monofunctional alcohol is 2,3-dibromopropanol.

8. The polyester of claim 1 wherein said polyester is dissolved in an ethylenic monomer co-polymerizable with said polyester.

9. The polyester of claim 8 wherein said ethylenic monomer is styrene.

10. The polyester of claim 1 wherein said polyester had an average molecular weight of from about 1,150 to about 1,450 and contains from 2 to about 2.6 reactive double bonds per molecular chain.

11. A solid, insoluble and infusible copolymerized fire retardant resin obtained by copolymerizing in the presence of a free radical catalyst an unsaturated polyester as defined in claim 1 with an ethylenic monomer.

12. A solid, insoluble and infusible copolymerized fire retardant resin obtained by co-polymerizing a polyester as defined in claim 7 with styrene in the presence of a free radical catalyst.

13. The fire retardant resin as described in claim 12 wherein the dicarboxylic acid mixture is a mixture of 2 equivalents of maleic anhydride and about 1 equivalent of chlorendic acid.

14. The fire retardant resin as described in claim 13 wherein the polyol mixture is a mixture of from about 0 to about 0.8 equivalents of ethylene glycol, about 1.2 to about 1.5 equivalents of glycerine and about 1 equivalent of 2,3-dibromopropanol, the total equivalents of hydroxyl groups present in said polyol mixture being slightly in excess of the total equivalents of carboxyl groups present.

15. A solid insoluble and infusible copolymerized fire retardant resin obtained by copolymerizing in the presence of a free radical catalyst an unsaturated polyester having an average molecular weight of from about 1150 to about 1450 and containing from about 2 to about 2.6 reactive double bonds per molecular chain, said polyester being the production of reaction of an acid component comprising about 1.5 to 0.5 equivalent proportion of chlorendic acid and about 1.5 to about 2.5 equivalent proportions of maleic anhydride with a polyol component comprising about 0.8 to about 1.2 equivalent proportions of 2,3-dibromo-1-propanol, from 0 to about 1 equivalent proportion of ethylene glycol, and from about 1 to about 2 equivalent proportions of glycerine with styrene in an amount of about 25 to about 40 percent by weight of the polyester-styrene mixture.

16. The fire retardant resin of claim 11 having improved weatherability which resins comprise a weather stabilizing amount of a trialkyl phosphate.

17. The resin of claim 16 in which the trialkyl phosphate is triethyl phosphate.

18. The resin of claim 17 in which the triethyl phosphate is present in an amount of from about 3 phr to about 12 phr.

19. The resin of claim 16 in which the triethyl phosphate is present in an amount of from about 5 to about 10 phr.

* * * * *